(12) United States Patent
Inoue

(10) Patent No.: US 11,194,528 B2
(45) Date of Patent: Dec. 7, 2021

(54) IMAGE FORMING APPARATUS, CONTROL METHOD OF IMAGE FORMING APPARATUS, AND PROGRAM

(71) Applicant: CANON KABUSHIKI KAISHA, Tokyo (JP)

(72) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/861,879

(22) Filed: Apr. 29, 2020

(65) Prior Publication Data
US 2020/0379695 A1 Dec. 3, 2020

(30) Foreign Application Priority Data

May 28, 2019 (JP) .............................. JP2019-099474

(51) Int. Cl.
G06F 3/12 (2006.01)
H04N 1/00 (2006.01)
G06K 15/02 (2006.01)

(52) U.S. Cl.
CPC .......... *G06F 3/1234* (2013.01); *G06F 3/1204* (2013.01); *G06F 3/1271* (2013.01); *G06F 3/1287* (2013.01); *H04N 1/00344* (2013.01)

(58) Field of Classification Search
None
See application file for complete search history.

(56) References Cited

U.S. PATENT DOCUMENTS

| 10,367,781 B2 | 7/2019 | Inoue | |
| 10,540,125 B2 | 1/2020 | Inoue | |
| 2007/0058196 A1* | 3/2007 | Nagahara | G06F 3/1211 358/1.15 |
| 2012/0026539 A1* | 2/2012 | Ohara | G06F 3/1292 358/1.15 |
| 2012/0320419 A1* | 12/2012 | Ito | H04N 1/32529 358/1.15 |
| 2013/0258387 A1* | 10/2013 | Hashimoto | G06K 15/4045 358/1.14 |
| 2015/0022851 A1* | 1/2015 | Kim | G06F 3/1203 358/1.15 |

(Continued)

FOREIGN PATENT DOCUMENTS

| JP | 2012133489 A | 7/2012 | |
| JP | 2018034375 | * 3/2018 | ............... G06F 3/12 |

*Primary Examiner* — Beniyam Menberu
(74) *Attorney, Agent, or Firm* — Carter, DeLuca & Farrell LLP

(57) ABSTRACT

An image forming apparatus using a print service etc., in which an operation load of a user and a load of a communication band are reduced when an error occurs. The image forming apparatus transmits an event confirmation request to a server and receives an event acknowledgement from the server to confirm whether or not a job fetch event has occurred. When an job fetch event is occurred, the image forming apparatus transmits a job acquisition request to the server to acquire print job data for executing a print job from the server. When a predetermined error occurs, the image forming apparatus stops event confirmation request processing even if the event is occurred in order to stop transmission of print job data by the server.

17 Claims, 15 Drawing Sheets

(56) References Cited

U.S. PATENT DOCUMENTS

2015/0092221 A1\* 4/2015 Ochi .................... G06F 3/1206
358/1.14
2015/0092233 A1\* 4/2015 Park .................. H04N 1/00307
358/1.15

\* cited by examiner

FIG. 7

| Error description | Is print processing possible? | Is print processing possible after recovery by user's operation? |
|---|---|---|
| ·fax failure | yes | – |
| ·scanner failure | yes | – |
| ·JAM | no | yes |
| ·no paper | no | yes |
| ·no toner | no | yes |
| ·developing unit failure | no | no |
| ·drum failure | no | no |

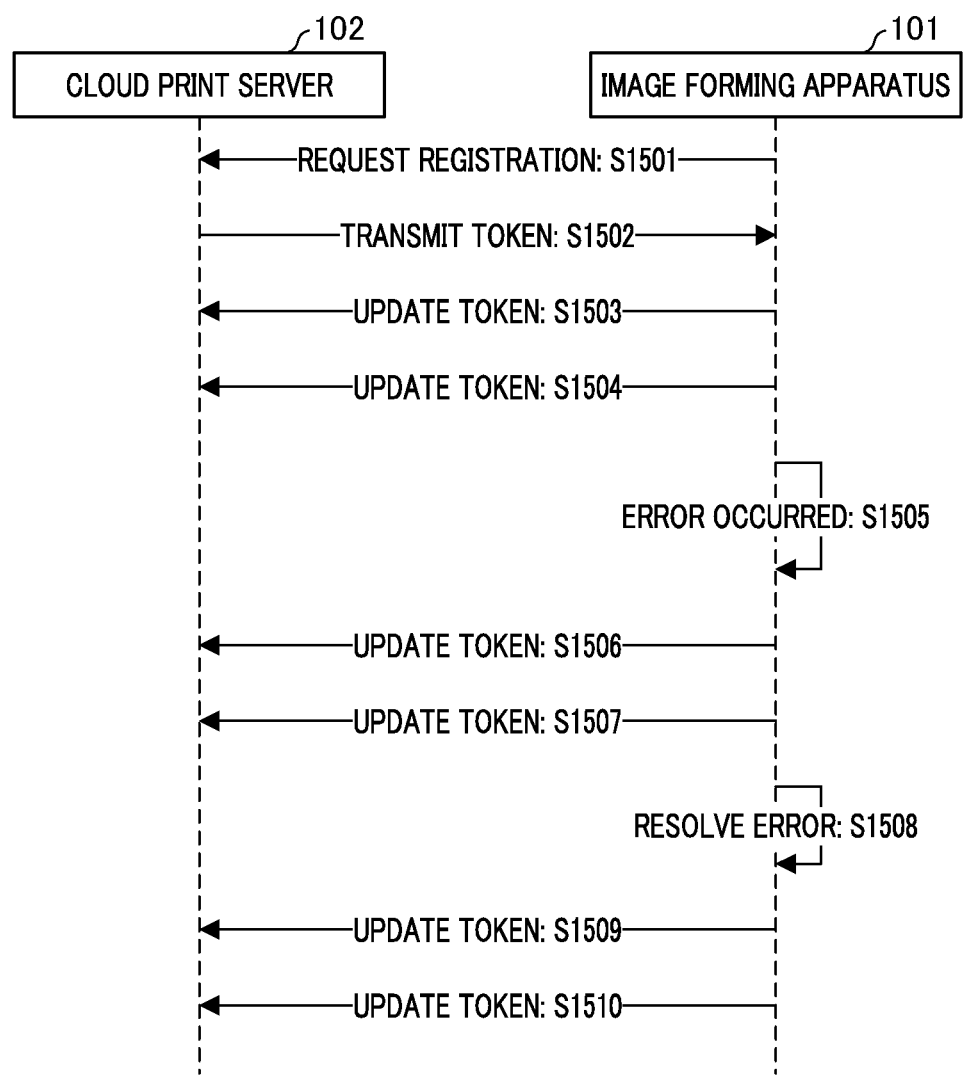

IMAGE FORMING APPARATUS, CONTROL METHOD OF IMAGE FORMING APPARATUS, AND PROGRAM

BACKGROUND OF THE INVENTION

Field of the Invention

The present invention relates to an image forming apparatus that is compatible with a cloud print service, a control method thereof, and a program thereof.

Description of the Related Art

In recent years, a print service using the Internet has been provided, which is referred to as a "cloud print service". An image forming apparatus is registered in advance in a server that provides a cloud print service. The registered image forming apparatus acquires and executes a print job stored in the server via the Internet (refer to, for example, Japanese Patent Application Laid-Open No. 2012-133489.).

For example, IPP-INFRA (PWG 5100.18) is specified as a standard for a communication protocol that implements a cloud print service. Here, the term "IPP" is the abbreviation for "Internet Printing Protocol". The term "INFRA" is the abbreviation for "Shared Infrastructure Extensions".

In IPP-INFRA, the image forming apparatus checks whether or not a print job addressed to the image forming apparatus is stored in the server periodically or when any event occurs. When the print job is stored in the server, the image forming apparatus acquires the print job and executes printing.

The image forming apparatus sometimes cannot execute printing due to an occurrence of trouble, for example, a developing unit failure or a drum failure. In such a case, the image forming apparatus provides a notification about the occurrence of a printing error to the server. Subsequently, the server provides the notification about the printing error to a user terminal.

SUMMARY OF THE INVENTION

The present invention is to perform control not to make a request related to job acquisition to the external in response to the occurrence of a predetermined error on an image forming apparatus, and thereby to restrain print control not intended by a user or an administrator from being performed even when the error occurs.

To solve this problem, an image forming apparatus according to one embodiment of the present invention is an image forming apparatus executing a print processing based on a print job obtained from a server via a network, comprising: at least one memory that stores a set of instructions; and at least one processor that executes the instructions, the instructions, when executed, causing the image forming apparatus to perform operations comprising: confirming whether or not a job fetch event has occurred by receiving a response to an event confirmation request by transmitting the event confirmation request to the server; transmitting a job acquisition request to the server if the job fetch event is occurred, and acquiring print job data for executing the print job from the server; performing the print processing by using the acquired print job data; and performing restriction so that the job acquisition request is not performed even if the job fetch event is occurred, in response to the occurrence of a predetermined error in the image forming apparatus.

According to one embodiment of the present invention, control is performed not to make a request related to job acquisition to the external device in response to the occurrence of a predetermined error in an image forming apparatus. Accordingly, it is possible to restrain print control not intended by a user or an administrator from being performed even when the error occurs. For example, since no request related to job acquisition is performed, the server does not perform a process for deleting the print job data stored in the server after the data is transmitted. Therefore, for example, the user does not have to input the same print job to the cloud print service again. Additionally, for example, the communication band is not wasted since the server does not transmit the print job data.

Further features of the present invention will become apparent from the following description of exemplary embodiments with reference to the attached drawings.

BRIEF DESCRIPTION OF THE DRAWINGS

FIG. 7 illustrates a list of errors in the image forming apparatus according to the first embodiment.

FIG. 15 is a sequence diagram illustrating a communication procedure in the image forming apparatus according to the fifth embodiment.

DESCRIPTION OF THE EMBODIMENTS

Embodiments of the present invention will be described below with reference to the drawings.

As described above, if an image forming apparatus cannot execute printing due, for example, to the occurrence of a developing unit failure or a drum failure, the image forming apparatus provides a notification about the occurrence of the printing error to a server. Subsequently, the server provides the notification about the printing error to a user terminal.

However, depending on a timing at which the printing error occurs in the image forming apparatus and a timing at which event acquisition processing is executed, a print job may be input from the user terminal to the server before the notification about the occurrence of the error is provided to the server. In this case, the image forming apparatus may execute acquiring the print job triggered by the event acquisition processing in spite of a situation in which printing is impossible. Under this situation, printing is impossible even if the print job is acquired. If a printing error occurs in such a situation, a user must input the print job to a cloud print service again after the printing error is resolved. For this reason, the conventional cloud print service has caused a large operation load for the user when an error occurs.

In response to the occurrence of a predetermined error in the image forming apparatus, one embodiment of the present invention performs control so as not to make a request related to job acquisition to the external device even if an event is present. Therefore, it is possible to reduce print control that is not intended by a user or an administrator being performed even when an error occurs.

First Embodiment

Figure 1:
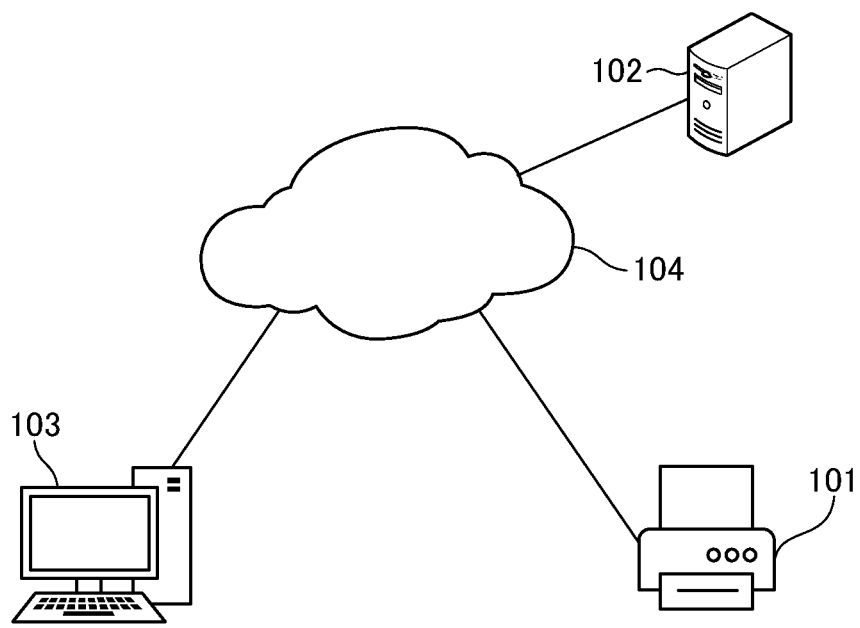
FIG. 1 schematically illustrates an overall configuration of a system according to the first embodiment of the present invention.

FIG. 1 is a conceptual diagram illustrating the overall configuration of a print system according to the present embodiment.

As shown in FIG. 1, the print system according to the present embodiment includes an image forming apparatus 101, a cloud print server 102, a client terminal 103, and the Internet 104.

The image forming apparatus 101 performs the desired printing by executing a print job. In this regard, the image forming apparatus 101 may be a device that can execute any other types of jobs such as a copy job. For example, a digital multifunction device or a single printer can be used to serve as the image forming apparatus 101.

The cloud print server 102 is a server for providing a cloud print service to the user. For this purpose, the cloud print server 102 provides the print job data received from the client terminal 103 to the image forming apparatus 101. The cloud print server 102 may comprise, for example, one or more server computers.

The client terminal 103 is a communication terminal operated by the user. As will be described below, in order to receive the cloud print service, the user transmits print job data from the client terminal 103 to the cloud print server 102. For example, a general-purpose personal computer or a smartphone can be used to serve as the client terminal 103.

The Internet 104 communicatively connects the cloud print server 102 to the image forming apparatus 101 and the client terminal 103. In place of the Internet 104, any other types of communication networks, such as a LAN (Local Area Network), may be used.

<Hardware Configuration of the Printing Apparatus>

Figure 2:
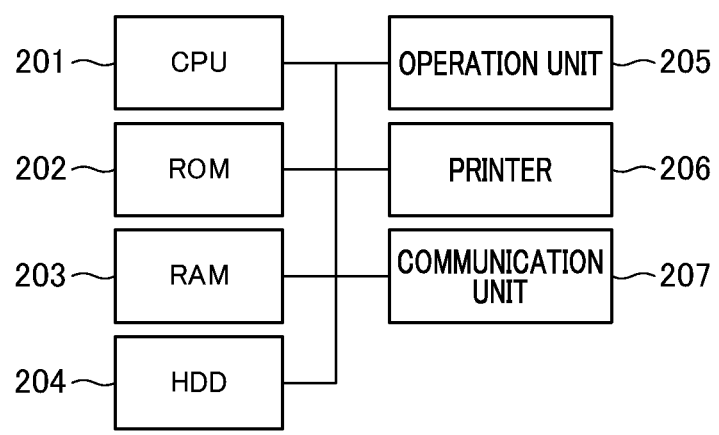
FIG. 2 is a block diagram schematically illustrating the hardware configuration of the image forming apparatus according to the first embodiment.

FIG. 2 is a block diagram schematically illustrating the hardware configuration of the image forming apparatus 101.

In FIG. 2, a CPU (Central Processing Unit) 201 is a processor that controls the operation of the entire image forming apparatus 101.

A ROM (Read Only Memory) 202 is a nonvolatile memory and stores the boot program of the image forming apparatus 101.

A RAM (Random Access Memory) 203 is a volatile memory. This RAM is used as a work area for calculation processing executed by the CPU 210, and is also used as a temporary storage region for deploying various control programs stored in the ROM 202 and an HDD 204.

The HDD (Hard Disk Drive) 204 is a nonvolatile hard disk having a capacity larger than the RAM 203. The HDD 204 stores a program for controlling the image forming apparatus 101.

Additionally, for example, the OS (Operating System) and a control application program are also stored in the HDD 204. Upon starting the image forming apparatus 101, the CPU 201 first executes the boot program stored in the ROM 202. The boot program reads the OS and the application program stored in the HDD 204 and deploys them in the RAM 203. The CPU 201 executes the OS and the application program to control the image forming apparatus 101. The CPU 201 also stores data to be used for executing the application program in the RAM 203 and reads and writes the data.

In the present embodiment, although each process shown in a flowchart to be described below is executed by the single CPU 201, different configurations are feasible. For example, a plurality of CPUs and microprocessors (MPU) may cooperate to execute each process shown in the flowchart to be described below. A part of the process to be described below may be executed by using a hardware circuit such as an ASIC (Application Specific Integrated Circuit) or an FPGA (Field-Programmable Gate Array).

An operation unit 205 is a display for which a touch operation is allowed.

A printer 206 is a printer engine that prints print data received from an external device via a communication unit 207.

The communication unit 207 is a network interface for communicatively connecting the image forming apparatus 101 to the Internet 104 (or, for example, an office LAN).

Note that the client terminal 103 and the cloud print server 102 each have the hardware configuration similar to the CPU 201, the ROM 202, the RAM 203, and the HDD 204, and the description thereof will be omitted.

<Software Configuration>

Figure 3:
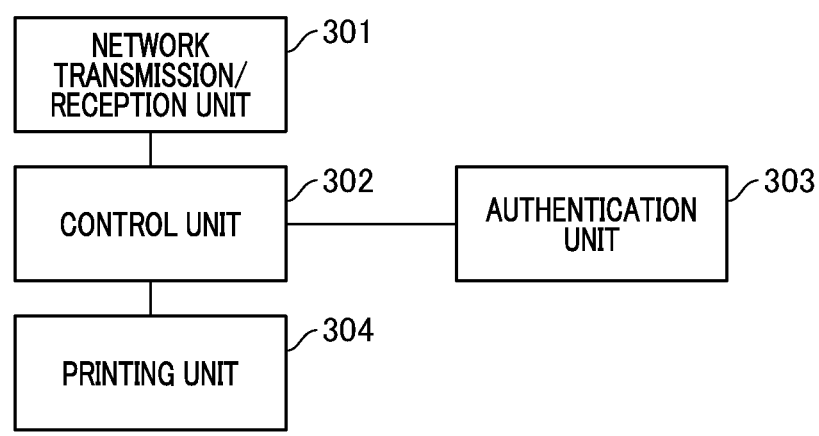
FIG. 3 is a block diagram schematically illustrating the software configuration of the image forming apparatus according to the first embodiment.

FIG. 3 is a block diagram schematically illustrating the software configuration of the image forming apparatus 101. The software configuration of FIG. 3 is achieved by deploying the program stored in the ROM 202 into the RAM 203, and executing the program by the CPU 201.

A network transmission/reception unit 301 receives communication data from an external terminal via the communication unit 207, and determines the type of the communication data. Subsequently, in accordance with the determination result, the network transmission/reception unit 301 makes a request to the external terminal and carries out response data transmission processing.

A control unit 302 controls data input/output of the operation unit 205 and also controls data input/output and processing operations of the network transmission/reception unit 301, an authentication unit 303, and a printing unit 304.

The authentication unit 303 performs user management of the image forming apparatus 101 and user authentication of an external authentication service. Specifically, the authentication unit 303 determines whether or not a user account and a password input from the operation unit 205 can be authenticated by collating them with the user information stored in the HDD 204. Additionally, the authentication unit 303 executes authentication processing for the image forming apparatus 101 to log in to an external cloud print service.

The printing unit 304 performs image processing such as rendering on the print job data received from the network transmission/reception unit 301, and performs control for causing the printer 206 to print using the print job data.

<Print Sequence in a Normal Condition>

Figure 4:
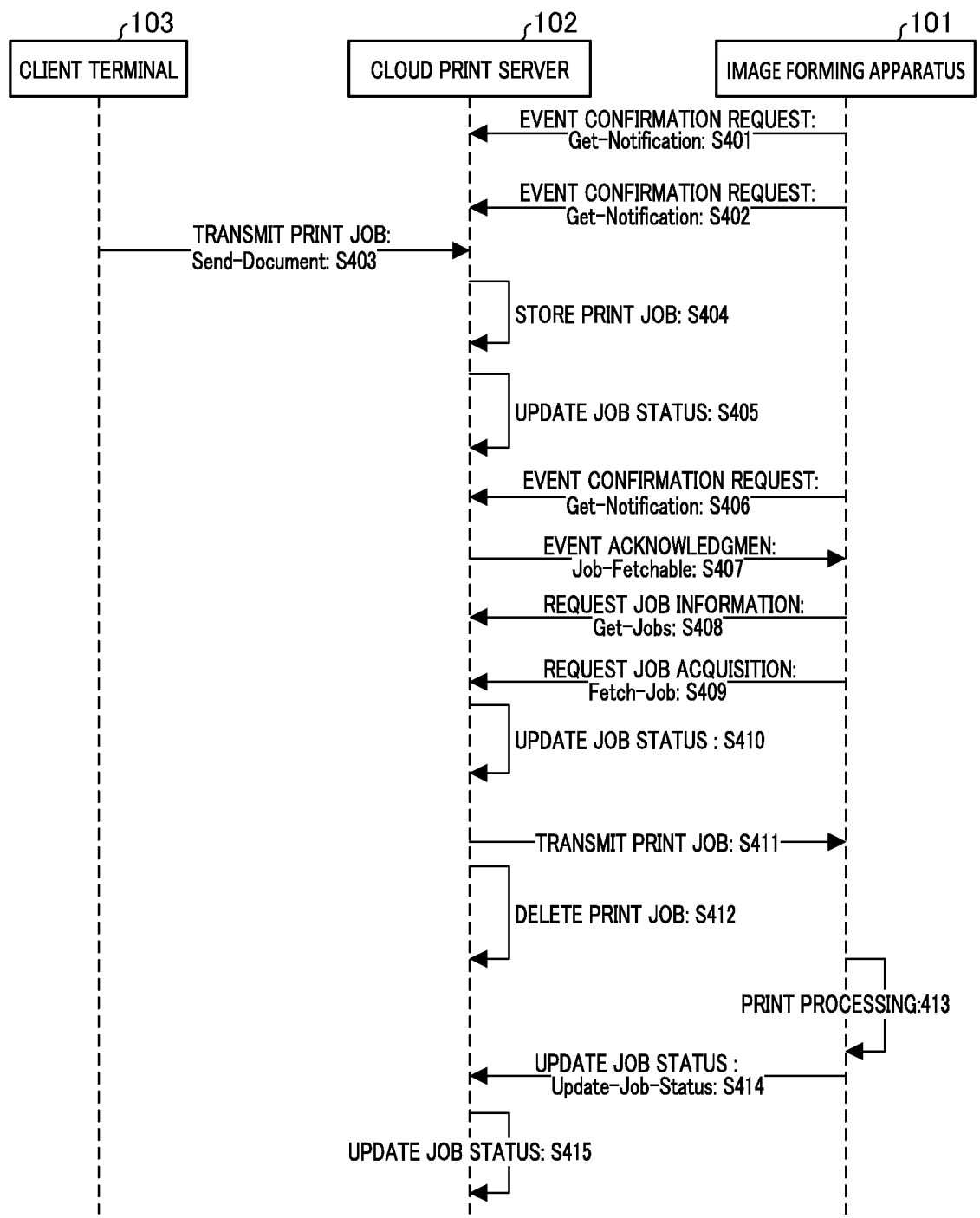
FIG. 4 is a sequence diagram illustrating a printing procedure in a normal condition in the image forming apparatus according to the first embodiment.
Figure 5:
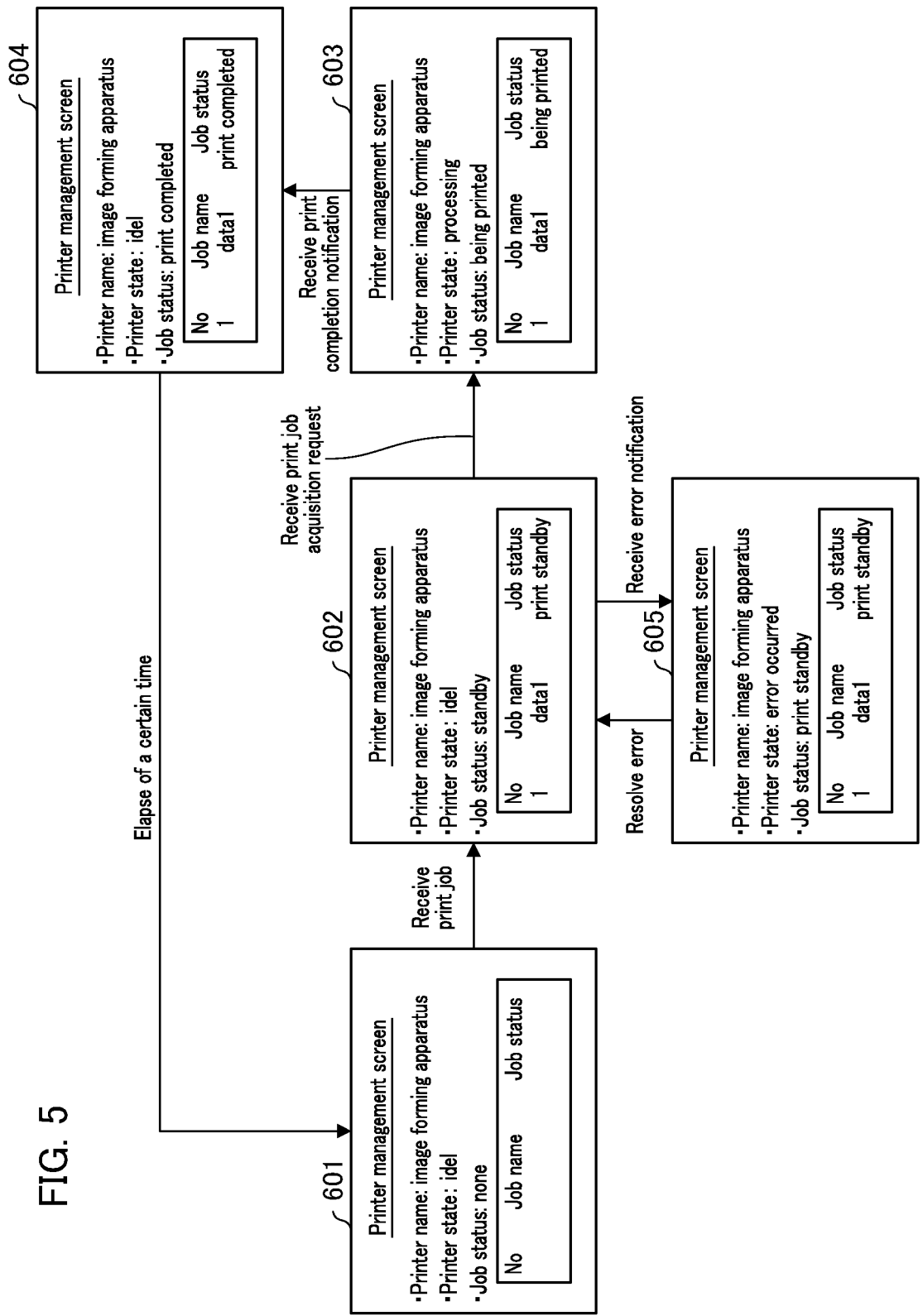
FIG. 5 is a conceptual diagram illustrating the transition of a management screen displayed by a cloud print server according to the first embodiment.

Next, a print sequence in a normal condition (when no error occurs) will be described with reference to FIG. 4 and FIG. 5. FIG. 4 is a sequence diagram illustrating a printing procedure in a normal condition. FIG. 5 is a conceptual diagram illustrating the transition of a management screen displayed by the display unit (not illustrated) of the cloud print server 102.

In the present embodiment, although the image forming apparatus 101 must be registered in the cloud print server 102 in advance, the description of the registration process will be omitted.

After the registration has completed, the image forming apparatus 101 periodically transmits event confirmation requests to the cloud print server 102 in order to confirm whether or not an event (for example, a print job) to be executed by the image forming apparatus 101 has occurred (S401, S402). The event confirmation request can be achieved by using, for example, the Get-Notification operation of IPP. The time interval for transmitting the confirmation request may be set to the image forming apparatus 101 or may be designated by the cloud print server 102.

In the present embodiment, the management screen (refer to FIG. 5) of the cloud print server 102 can be viewed by the web browser of the client terminal 103. Accordingly, the user can check the printer state and the job status of the image forming apparatus 101 registered in the cloud print server 102 on a browsing screen of the client terminal 103. In a state prior to receiving the print job data, the cloud print server 102 displays a management screen 601. On the management screen 601, "NONE" is displayed as the job status. When the image forming apparatus 101 is operating normally and printing is not in progress, "IDLE" is displayed as the printer state.

The user operates the client terminal 103 to select the print job data and transmits it to the cloud print server 102 (S403).

Upon receiving the print job data, the cloud print server 102 stores the print job data in its own storage (S404) and updates the job status (S405). As a result, a job status screen 602 indicating the print waiting state is displayed on the management screen of the cloud print server 102.

Subsequently, when the image forming apparatus 101 transmits an event confirmation request (S406), the cloud print server 102 checks whether or not print job data is stored. In this case, since the print job has been input from the client terminal 103 in step S403 described above, the cloud print server 102 transmits an event acknowledgement indicating "event is present" to the image forming apparatus 101 (S407). For example, in IPP, this event acknowledgment is a Job-Fetchable event.

Upon receiving this acknowledgment, the image forming apparatus 101 transmits a job information acquisition request to the cloud print server 102 (S408). For example, in IPP, this request corresponds to a Get-Jobs operation.

Subsequently, the image forming apparatus 101 makes an actual job acquisition request to the cloud print server 102 (S409). For example, in IPP, this request is a Fetch-Job operation.

Upon receiving the job acquisition request, the cloud print server 102 updates the job status to "BEING PRINTED" (S410). As a result, a job status screen 603 indicating that printing is in-progress is displayed on the management screen of the cloud print server 102.

Subsequently, the cloud print server 102 transmits the print job data stored in step S404 to the image forming apparatus 101 (S411).

When the transmission of the print job data has completed, the cloud print server 102 deletes the print job data from its own storage (S412).

Upon receiving the print job data, the image forming apparatus 101 executes print processing (S413). When the print processing has completed normally, the image forming apparatus 101 transmits job status update information that provides a notification about the completion of the print job to the cloud print server 102 (S414).

Upon receiving the print job completion notification, the cloud print server 102 updates the job status to "Completed" (S415). As a result, a job management screen 604 indicating that print has completed is displayed on the management screen of the cloud print server 102.

<Print Sequence when an Error Occurs>

Figure 6:
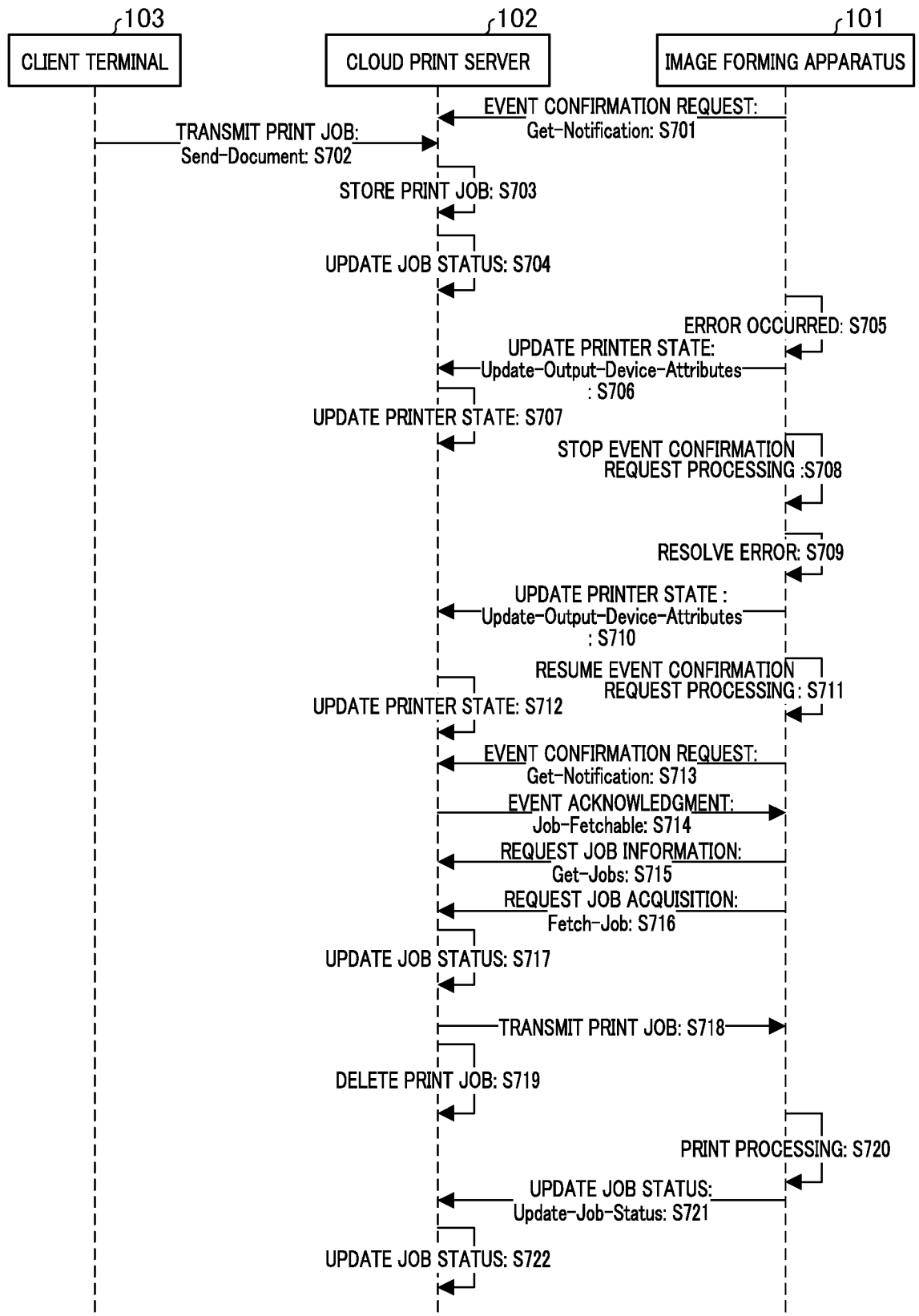
FIG. 6 is a sequence diagram illustrating a printing procedure in an abnormal condition in the image forming apparatus according to the first embodiment.

Next, with reference to FIG. 5 and FIG. 6, a print sequence in an abnormal condition (when an error occurs) will be described. FIG. 6 is a sequence diagram illustrating a print procedure in an abnormal condition.

In FIG. 6, the procedure before an error occurs is similar to that in FIG. 4 (in a normal condition). Specifically, the image forming apparatus 101 periodically transmits event confirmation requests to the cloud print server 102 (S701). Upon receiving the print job data from the client terminal 103 (S702), the cloud print server 102 stores the print job data in its own storage (S703) and updates the job status (S704). As a result, the management screen of the cloud print server 102 transitions from the screen 601 to the screen 602.

Here, it is assumed that a printing error (a developing unit failure, in the present embodiment) occurs in the image forming apparatus 101 (S705).

Upon detecting the occurrence of the error, the image forming apparatus 101 transmits a notification about updating the printer state to the cloud print server 102 (S706). For example, in IPP, an Update-output-Device-Attribute operation can be used for this notification.

Upon receiving the update notification, the cloud print server 102 changes the printer state stored in its own server to "Error occurred" (S707). As a result, a job status screen 605 indicating that an error is occurring is displayed on the management screen of the cloud print server 102.

Additionally, the image forming apparatus 101 stops transmitting the event confirmation request to the cloud print server 102 by performing error processing (S708). As a result, the image forming apparatus 101 requests the cloud print server 102 neither for job information (S408.) nor for job acquisition (S409.).

Hence, when an error occurs, the image forming apparatus 101 does not acquire and execute the print job data, and thus the developing unit or the like does not stop due to the error. Additionally, since the cloud print server 102 does not transmit the print job data to the Internet 104, the communication band is not used wastefully (refer to step 411.). Furthermore, since the print job data is not transmitted, the cloud print server 102 does not delete the stored print job data, and thus the user's operation load is reduced (refer to step 412.).

Subsequently, for example, a repair technician repairs the error, and thereby the error state of the image forming apparatus 101 is removed (S709). Then, the image forming apparatus 101 transmits a notification about updating the printer state, and thereby, the cloud print server 102 is notified about the fact that the printer state has become normal (S710).

Subsequently, the image forming apparatus 101 executes a process for resuming the periodic transmission of the event confirmation request to the cloud print server 102 (S711).

On the other hand, the cloud print server 102 updates the printer state from "error occurred" to "idle state" (S712) upon receiving the printer state update notification (S710). As a result, the job status screen 602 is displayed on the management screen of the cloud print server 102.

The subsequent print sequences are similar to those in FIG. 4 (under normal conditions).

Specifically, when the image forming apparatus 101 transmits an event confirmation request (S713), the cloud print server 102 returns the event acknowledgement (S714). Subsequently, the image forming apparatus 101 transmits a job information acquisition request (S715), and furthermore, transmits a job acquisition request (S716).

Upon receiving the job acquisition request, the cloud print server 102 updates the job status to "BEING PRINTED" (S717) and displays a job status screen 603 indicating that printing is in-progress on the management screen. Additionally, the cloud print server 102 transmits the print job data stored in step S703 to the image forming apparatus 101 (S718).

When the transmission of the print job data has completed, the cloud print server 102 deletes the print job data from its own storage (S719).

Upon receiving the print job data, the image forming apparatus 101 executes print processing (S720). After printing has completed, the image forming apparatus 101 transmits the job status update information that provides a notification about the completion of print job to the cloud print server 102 (S720).

Upon receiving the print job completion notification, the cloud print server 102 updates the job status to "Completed" (S722). As a result, the job management screen 604 indicating that printing has completed is displayed on the management screen of the cloud print server 102.

FIG. 7 illustrates a list of errors in the image forming apparatus 101.

As shown in FIG. 7, errors occurring in the image forming apparatus 101 are classified into "errors that do not affect the decision of whether or not print processing is possible" and "errors that affect the decision of whether or not print processing is possible". The "errors that affect the decision of whether or not print processing is possible" are further classified into "errors that can be recovered by a user operation" and "errors that need a recovery operation by a repair technician".

The "errors that do not affect the decision of whether or not print processing is possible" are errors that are not related to a print job such a fax failure and a scanner failure.

The "errors that can be recovered by a user operation" are failures that can be recovered by a user himself/herself. For example, failures such as recording paper shortage, toner shortage, and paper jam can be recovered by the user performing operations such as replenishing the recording paper, replacing the toner cassette, and removing the jammed recording paper on the spot.

The "errors that need a recovery operation by a repair technician" include a developing unit failure and a drum failure. These failures need to be repaired by a repair technician. The repair work typically uses several hours to several days with the image forming apparatus 101 turned off.

The present embodiment is particularly suitable when the "errors that need a recovery operation by a repair technician", such as a developing unit failure, occur. The present embodiment can also be applied when "errors that do not affect the decision of whether or not print processing is possible" or the "errors that can be recovered by a user operation" occur.

In the present embodiment, the image forming apparatus 101 is configured such that the user can set the decision of whether or not to perform a "stopping of event confirmation request processing" (S708) for each type of errors.

Figure 8:
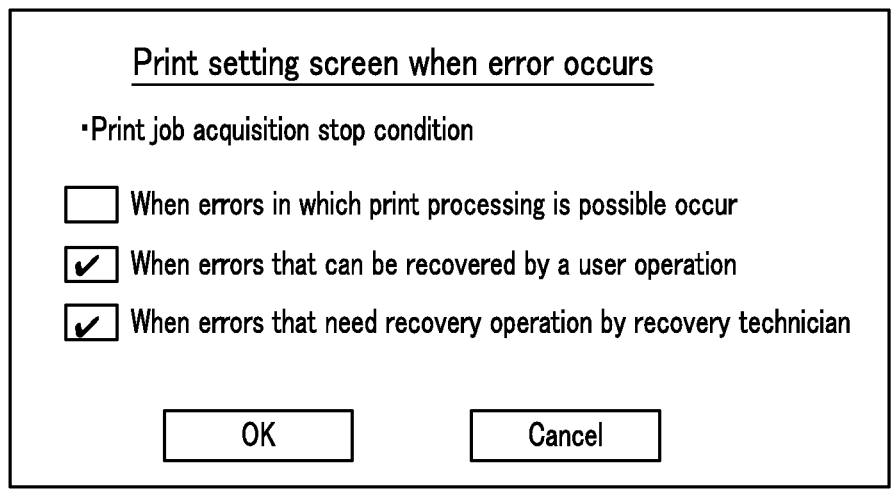
FIG. 8 is a conceptual diagram illustrating a print setting screen in an abnormal condition in the image forming apparatus according to the first embodiment.

FIG. 8 illustrates an example of the screen of the image forming apparatus 101 for making a user perform such a setting. The user can select one or more type of errors for which the event confirmation request processing is to be stopped by using the print setting screen shown in FIG. 8. When the "errors that do not affect the decision of whether or not print processing is possible" is selected, both the "errors that need a recovery operation by a repair technician" and the "errors that can be recovered by a user operation" are also automatically selected. When the "errors that can be recovered by a user operation" is selected, the "errors that need a recovery operation by a repair technician" is also automatically selected. In this case, the "errors that do not affect the decision of whether or not print processing is possible" is optionally selected by the user.

Specifically, the user can switch the levels of stopping the reception of the print job from the cloud print server 102 stages through the screen of FIG. 8. The settings based on the selected state performed through the screen are stored in the ROM 202 or the HDD 204 as the operation settings of the image forming apparatus 101. For example, when only the "errors that need a recovery operation by a repair technician" is selected, information indicating the first setting is stored as the operation setting of the image forming apparatus. When the "errors that need a recovery operation by a repair technician" and "errors that can be recovered by a user operation" are selected, information indicating the second setting is stored as the operation setting. When all the items are selected, information indicating the third setting is stored as the operation setting.

As described above, according to the present embodiment, when a predetermined error occurs in the image forming apparatus 101, the event confirmation request processing performed by the image forming apparatus 101 stops. Accordingly, the image forming apparatus 101 stops acquiring the print job data, and as a result, the cloud print server 102 does not delete the stored print job data.

Therefore, according to the present embodiment, the user does not have to input the same print job to the cloud print server 102 again after the error is resolved.

Additionally, the cloud print server 102 does not transmit the print job data to the Internet 104 after an error occurs, the communication band is not used wastefully.

Second Embodiment

The second embodiment of the present invention will be described below. Since the overall configuration of the system according to the present embodiment and the hardware configuration and the software configurations of the image forming apparatus are similar to those of the first embodiment described above (refer to FIG. 1 to FIG. 3), the description thereof will be omitted.

Additionally, since the printing procedure in a normal condition in the system of the present embodiment is similar to that in the first embodiment (refer to FIG. 4) described above, the description thereof will be omitted.

In the first embodiment, the event confirmation request processing stops when a predetermined error occurs in the image forming apparatus 101 (refer to S708 in FIG. 6). In contrast, in the present embodiment, when a predetermined error occurs in the image forming apparatus 101, the acquisition of the print job data stops by stopping the job acquisition request processing.

Figure 9:
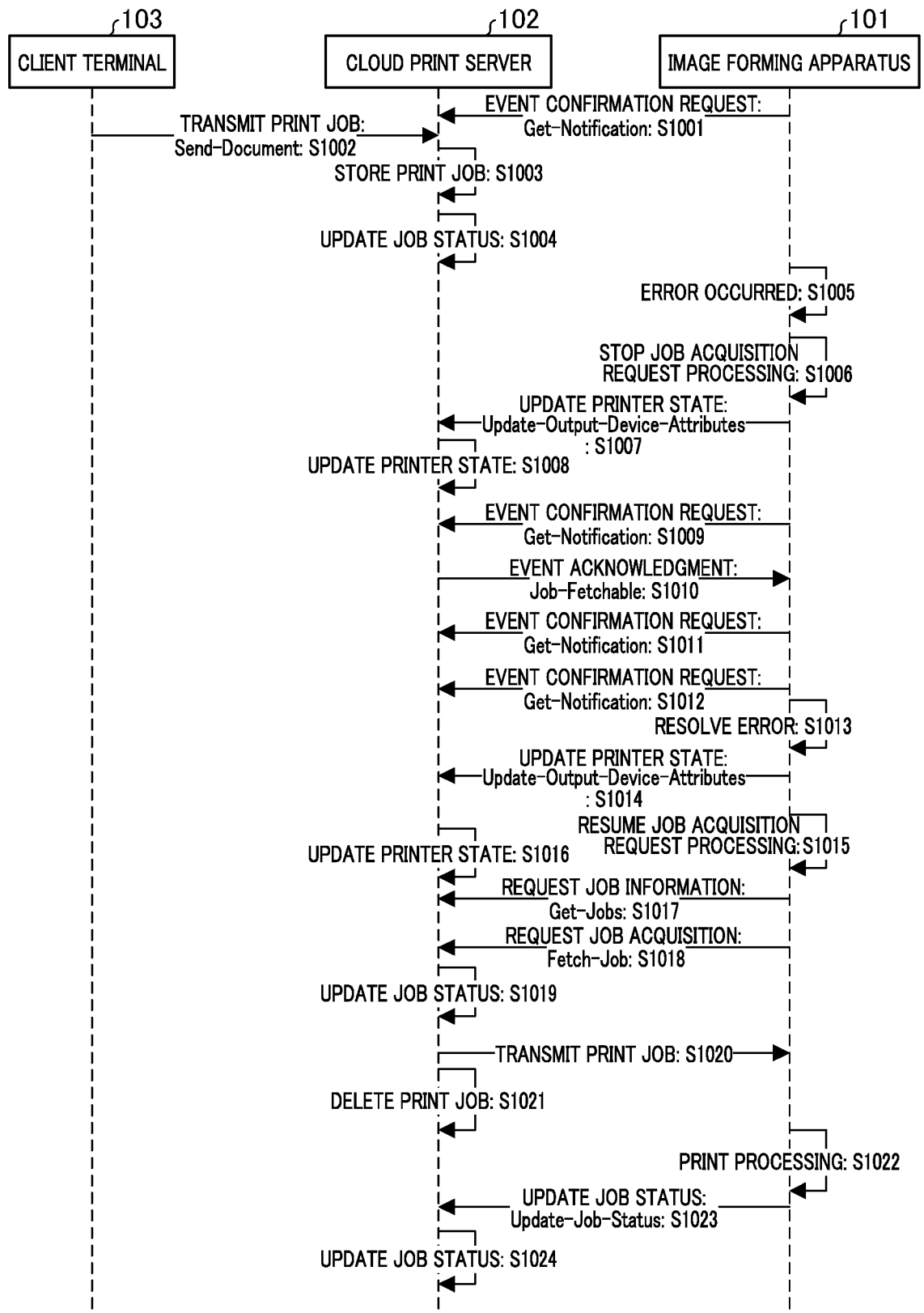
FIG. 9 is a sequence diagram illustrating a printing procedure in the image forming apparatus according to the second embodiment.

FIG. 9 is a sequence diagram illustrating a printing procedure in an abnormal condition in the system according to the present embodiment.

In FIG. 9, the procedure before an error occurs is similar to that in the first embodiment (refer to FIG. 6). Specifically, the image forming apparatus 101 periodically transmits event confirmation requests to the cloud print server 102 (S1001). Upon receiving the print job data from the client terminal 103 (S1002), the cloud print server 102 stores the print job data in its own storage (S1003) and updates the job status (S1004)

Here, it is assumed that a printing error (for example, a developing unit failure) occurs in the image forming apparatus 101 (S1005). Upon detecting the occurrence of the error, the image forming apparatus 101 stops the job acquisition request transmission processing (S1006).

Further, upon detecting the occurrence of the error, the image forming apparatus 101 transmits a notification about updating the printer state to the cloud print server 102 (S1007). Upon receiving the update notification, the cloud print server 102 changes the printer state stored in its own server to "error occurred" (S1008).

As described above, the image forming apparatus 101 according to the present embodiment performs a process for transmitting the event confirmation request to the cloud print server 102 even if it has detected the occurrence of the error (S1009). Upon receiving the event confirmation request, the cloud print server 102 returns the event acknowledgement indicating "Event is present" to the image forming apparatus 101 (S1010).

Upon receiving the event acknowledgement, the image forming apparatus 101 recognizes that the print job data is stored in the cloud print server 102. However, in the present embodiment, the job acquisition request transmission processing stops, and so the image forming apparatus 101 does not perform the process for requesting the job information. Accordingly, the print job data remains stored in the cloud print server 102.

Thereafter, the image forming apparatus 101 continues to periodically transmit the event confirmation requests (S1011 and 1012). However, the cloud print server 102 of the present embodiment does not return the event acknowledgement once a response of "event is present" is performed.

However, each time the cloud print server 102 receives the event confirmation request from the image forming apparatus 101, the cloud print server 102 may return the event acknowledgement "event is present". Additionally, when there is no change in the stored event after the event acknowledgement "event is present" is returned, the event acknowledgement "event is not present" may be returned. Specifically, the contents of the notification included in the event acknowledgement can be arbitrarily determined based on the specifications of the cloud print server 102.

As described above, in the present embodiment, as in the first embodiment, when an error occurs, the image forming apparatus 101 does not acquire and execute the print job data, and thus the developing unit or the like does not stop due to the error. Additionally, since the cloud print server 102 does not transmit the print job data to the Internet 104, the communication band is not used wastefully. Furthermore, since the print job data is not transmitted, the cloud print server 102 does not delete the stored print job data, and thus the user's operation load is reduced.

Subsequently, a repair technician repairs the image forming apparatus 101, and thus the error state of the image forming apparatus 101 is resolved (S1013).

Subsequently, the image forming apparatus 101 transmits a notification about updating the printer state, and thereby, a notification about the printer state having become normal is provided to the cloud print server 102 (S1014). Then the image forming apparatus 101 executes a process for resuming the job acquisition request processing (S1015).

Upon receiving the printer state update notification (S1014), the cloud print server 102 updates the printer state from "error occurred" to "idle state" (S1016).

The image forming apparatus 101 transmits the job information request to the cloud print server 102 (S1017), and further transmits the job acquisition request (S1018).

As described above, in the present embodiment, the image forming apparatus 101 stores the event acknowledgement "event is present" received in step S1010, and transmits the job acquisition request immediately after the error is resolved (S1013). However, regardless of whether or not the event acknowledgement of "Event is present" has been received, the job acquisition request may always be transmitted after the error is resolved.

The subsequent printing procedure is similar to that of the first embodiment. Specifically, upon receiving the job acquisition request, the cloud print server 102 updates the job status to "Being Printed" (S1019), and transmits the print job data stored in step S1003 to the image forming apparatus 101 (S1020). When the transmission of the print job data has completed, the cloud print server 102 deletes the print job data from its own storage (S1021).

Upon receiving the print job data, the image forming apparatus 101 executes print processing (S1022). After print has completed, the image forming apparatus 101 transmits the job status update information that provides a notification about the completion of print job to the cloud print server 102 (S1023).

Upon receiving the notification about the completion of the print job, the cloud print server 102 updates the job status to "Completed" (S1024).

Also in the present embodiment, the cloud print server 102 updates the display of the management screen each time it updates the job status. The description thereof will be omitted because this is similar to that of the first embodiment (refer to FIG. 5).

As described above, in the present embodiment, the job acquisition request processing stops when a predetermined error occurs in the image forming apparatus 101, and thereby, the acquisition of the print job data by the image forming apparatus 101 stops. According to the present embodiment, the cloud print server 102 consequently does not delete the stored print job data, and thereby the user does not have to input the same print job to the cloud print server 102 again after the error is resolved.

Additionally, since the cloud print server 102 does not transmit the print job data to the Internet 104 after the error occurs, the communication band is not used wastefully.

Additionally, in the present embodiment, the image forming apparatus 101 transmits the event confirmation request even during the occurrence of the error. Accordingly, if an event not related to the print processing occurs in the cloud print server 102, the image forming apparatus 101 can recognize the occurrence of the event. The image forming apparatus 101 can acquire, for example, a state change of the cloud print server 102 to serve as event information during the occurrence of the error.

Note that the feature in which errors occurring in the image forming apparatus 101 are classified into a plurality of types of errors, and the acquisition and execution of the print job can be set to stop only when a predetermined error occurs (refer to FIG. 7 and FIG. 8) is similar to that in the first embodiment.

Third Embodiment

The third embodiment of the present invention will be described below.

The present embodiment is an example in which the present invention is applied to a system configured so that a user can manage his or her own job.

The overall configuration of the system according to the present embodiment and the hardware configuration and the software configuration of the image forming apparatus are substantially the same as those of the first embodiment described above (refer to FIG. 1 to FIG. 3).

However, the image forming apparatus 101 according to the present embodiment is configured so as to store the user information (accounts and passwords) related to one or more users in storage such as an HDD. The stored user information is collated with the user information that has been directly input to the operation unit 205 (refer to FIG. 2) by the user, and thereby, the user can log in to the image forming apparatus 101.

As described below, according to the present embodiment, the acquisition of the print job data stops by stopping the job acquisition request processing when a predetermined error occurs in the image forming apparatus 101, as in the second embodiment.

Figure 10:
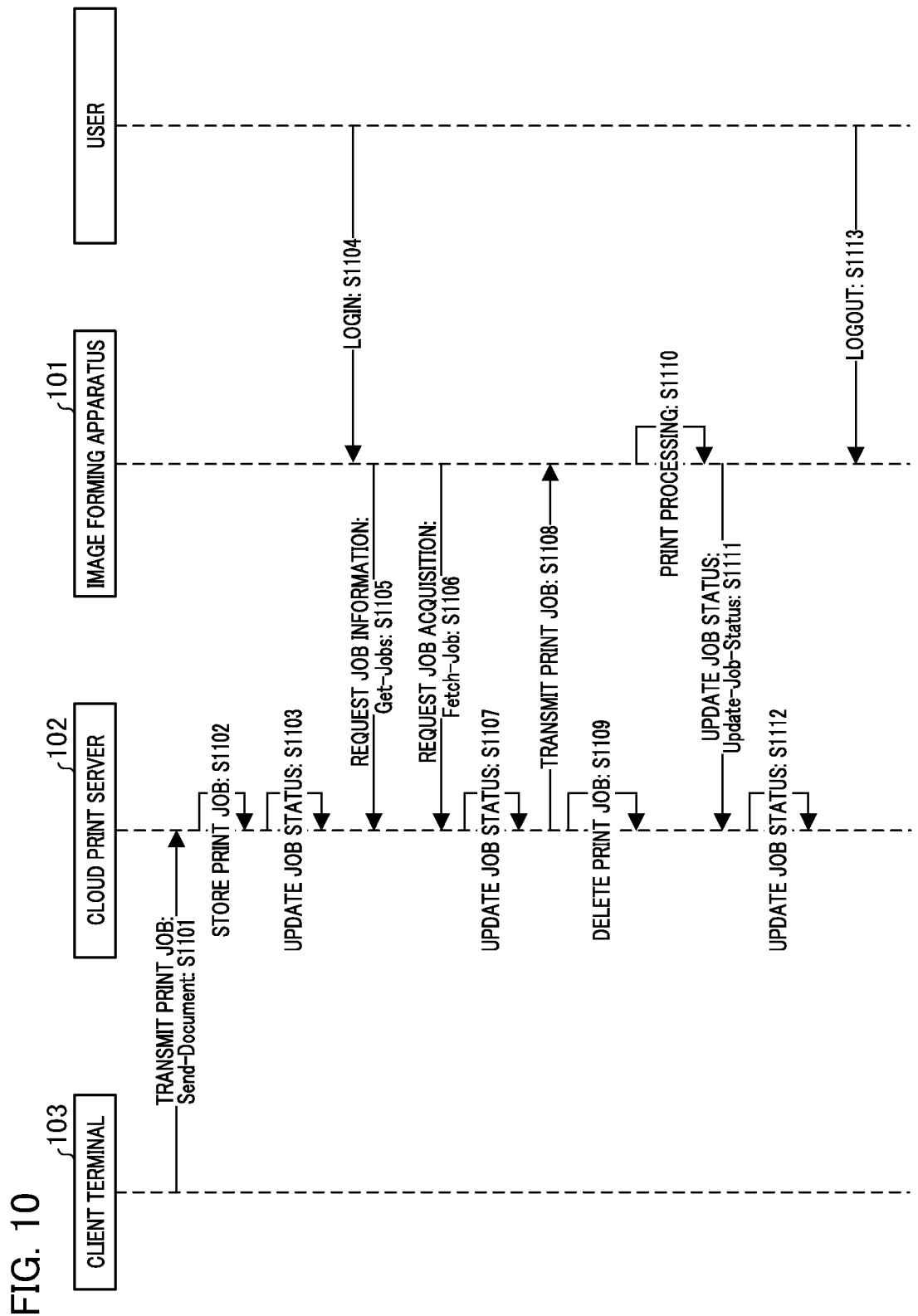
FIG. 10 is a sequence diagram illustrating a printing procedure in a normal condition in the image forming apparatus according to the third embodiment.

FIG. 10 illustrates a printing procedure in a normal condition in the system according to the present embodiment.

The user operates the client terminal 103 to transmit the print job data to the cloud print server 102 (S1101).

The cloud print server 102 receives the print job data, stores it in its own storage (S1102), and updates the job status (S1103).

Subsequently, the user operates the operation unit 205 of the image forming apparatus 101 to log into the image forming apparatus 101 (S1104).

When the login is successful, the image forming apparatus 101 transmits a job information acquisition request for confirming whether or not a job related to the user has been stored to the cloud print server 102 (S1105). For example, in IPP, methods for confirming only jobs for a particular user include methods that use the Which-Jobs attribute, the Requesting-user-name attribute, and the Requesting-user-uri attribute.

Subsequently, the image forming apparatus 101 transmits the job information acquisition request to the cloud print server 102 (S1106).

Upon receiving the job information acquisition request, the cloud print server 102 updates the job status to "Being Printed" (S1107), and then transmits the print job data related to the user to the image forming apparatus 101 (S1108). When the transmission of the print job data has completed, the cloud print server 102 deletes the transmitted print job data from its own storage (S1109).

Upon receiving the print job data, the image forming apparatus 101 executes print processing (S1110). When the print processing has completed normally, the image forming apparatus 101 transmits the job status update information that provides a notification about the completion of the print job to the cloud print server 102 (S1111).

Upon receiving the notification about the completion of the print job, the cloud print server 102 updates the job status to "Completed" (S1112).

Subsequently, the user logs out and the print processing ends (S1113).

Figure 11:
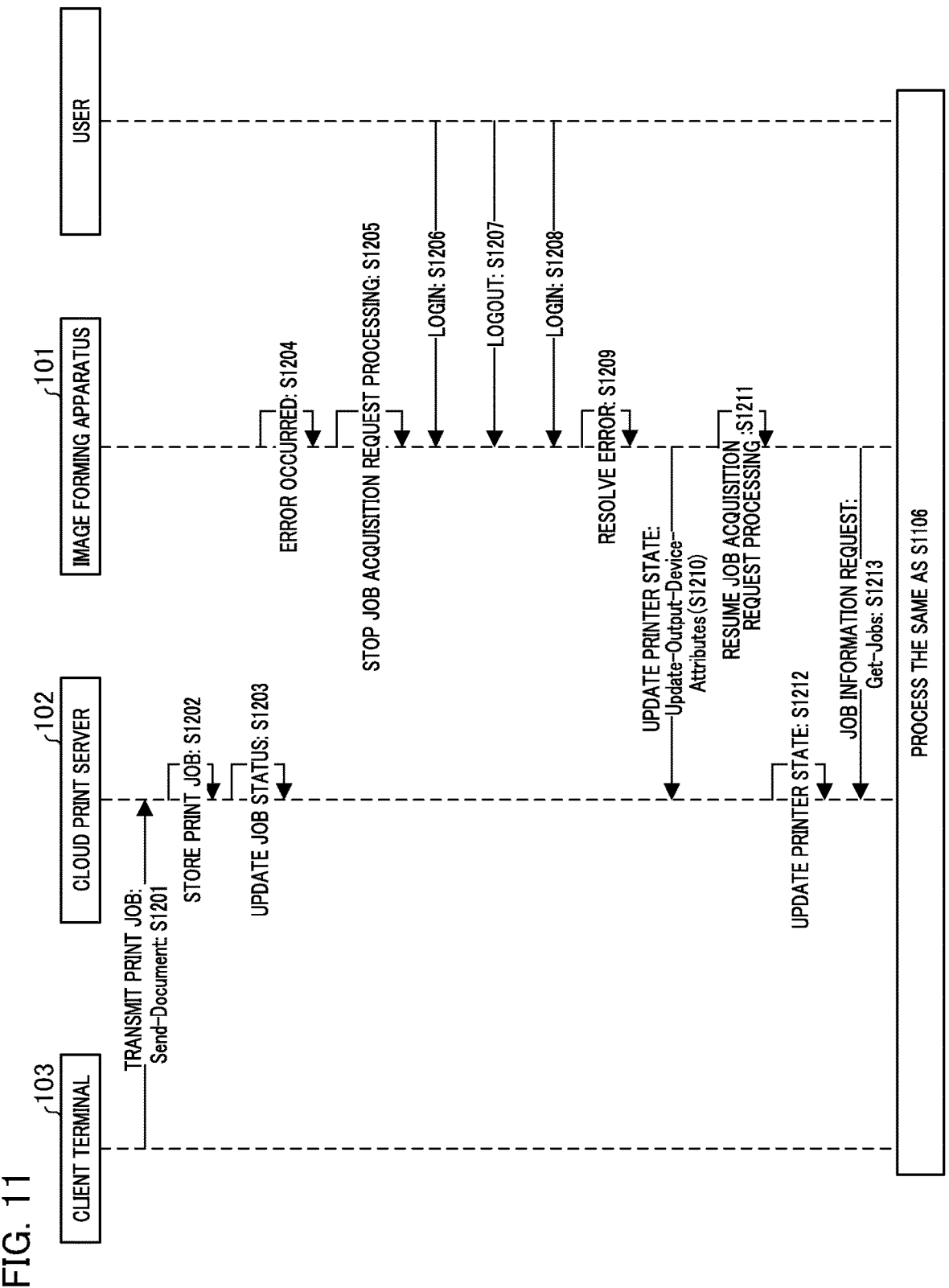
FIG. 11 is a sequence diagram illustrating a printing procedure in an abnormal condition in the image forming apparatus according to the third embodiment.

FIG. 11 illustrates a printing procedure in an abnormal condition in the system according to the present embodiment.

Similar to the above (refer to FIG. 10), the user transmits the print job data from the client terminal 103 to the cloud print server 102 (S1201). The cloud print server 102 receives the print job data and stores it in its own storage (S1202). Then, the cloud print server 102 updates the job status (S1203).

Here, it is assumed that a printing error (for example, a developing unit failure) occurs in the image forming apparatus 101 (S1204). Upon detecting the occurrence of the error, the image forming apparatus 101 stops the job acquisition request transmission processing (S1205).

After the job acquisition request processing stops, the image forming apparatus 101 does not transmit the job acquisition request to the cloud print server 102 even if the user repeatedly logs in and out of the image forming apparatus 101 (S1206 to S1208).

Subsequently, when the error state of the image forming apparatus 101 is resolved as a result for repairing the image forming apparatus 101 by repair technician (S1209), a notification about updating the printer state is transmitted from the image forming apparatus 101 to the cloud print server 102 (S1210). The image forming apparatus 101 executes a process for resuming the job acquisition request processing (S1211).

Upon receiving the printer state update notification (S1210), the cloud print server 102 updates the printer state from "error occurred" to "idle state" (S1212).

The image forming apparatus 101 transmits the job information request to the cloud print server 102 (S1213).

Since the subsequent procedure is similar to that in step S1106 of the printing procedure in a normal condition (refer to FIG. 10), the description thereof will be omitted.

Also in the present embodiment, the cloud print server 102 updates the display of the management screen every time it updates the job status. The description thereof will be omitted because this is similar to that of the first embodiment (refer to FIG. 5).

As described above, also in the present embodiment, the job acquisition request processing stops when a predetermined error occurs in the image forming apparatus 101, as in the case of the second embodiment, and thereby, the acquisition of the print job data by the image forming apparatus 101 stops. According to the present embodiment, the cloud print server 102 thus does not delete the print job data of the logged-in user, and the logged-in user does not have to input the same print job to the cloud print server 102 again after the error is resolved.

Additionally, as in the second embodiment, since the cloud print server 102 does not transmit the print job data to the Internet 104 after the error occurs, the communication band is not used wastefully.

Additionally, as in the second embodiment, the image forming apparatus 101 transmits the event confirmation request even during occurrence of the error. Accordingly, if an event not related to printing occurs in the cloud print server 102, the image forming apparatus 101 can recognize the occurrence of the event. For example, during occurrence of the error, the image forming apparatus 101 can acquire, for example, a state change of the cloud print server 102 to serve as event information.

Note that the feature in which errors occurring in the image forming apparatus 101 are classified into a plurality of types of errors and the acquisition and execution of the print job can be set to stop only when a predetermined error occurs (refer to FIG. 7 and FIG. 8) is similar to that in the first and second embodiments.

Fourth Embodiment

The fourth embodiment of the present invention will be described below.

The present embodiment is an example in which the present invention is applied to a system configured so that the user can select and execute his or her own print job after the user logs in.

The overall configuration of the system according to the present embodiment and the hardware configuration and the software configuration of the image forming apparatus are substantially the same as those of the first embodiment described above (refer to FIG. 1 to FIG. 3).

Figure 12:
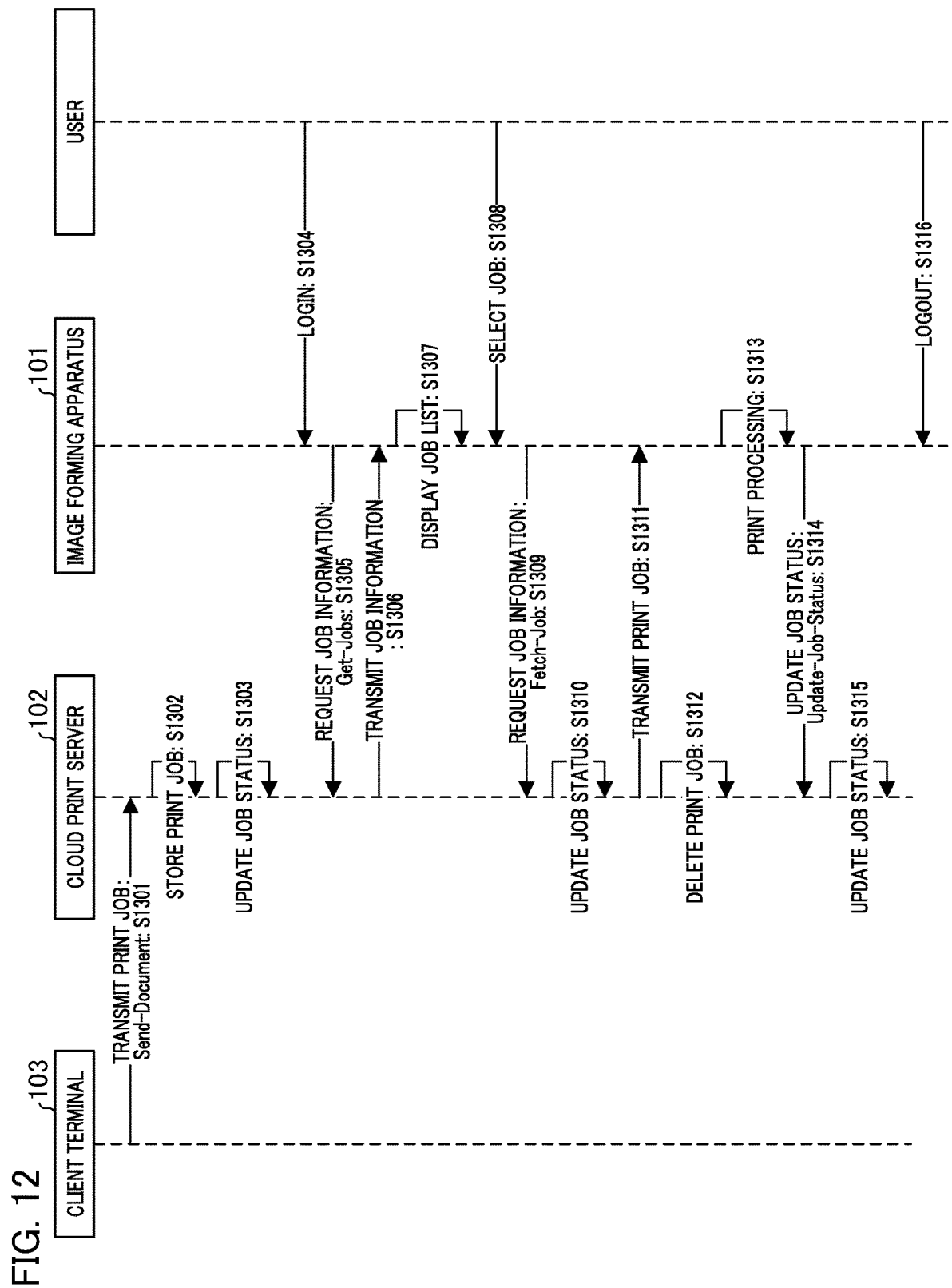
FIG. 12 is a sequence diagram illustrating a printing procedure in a normal condition in the image forming apparatus according to the fourth embodiment.
Figure 13:
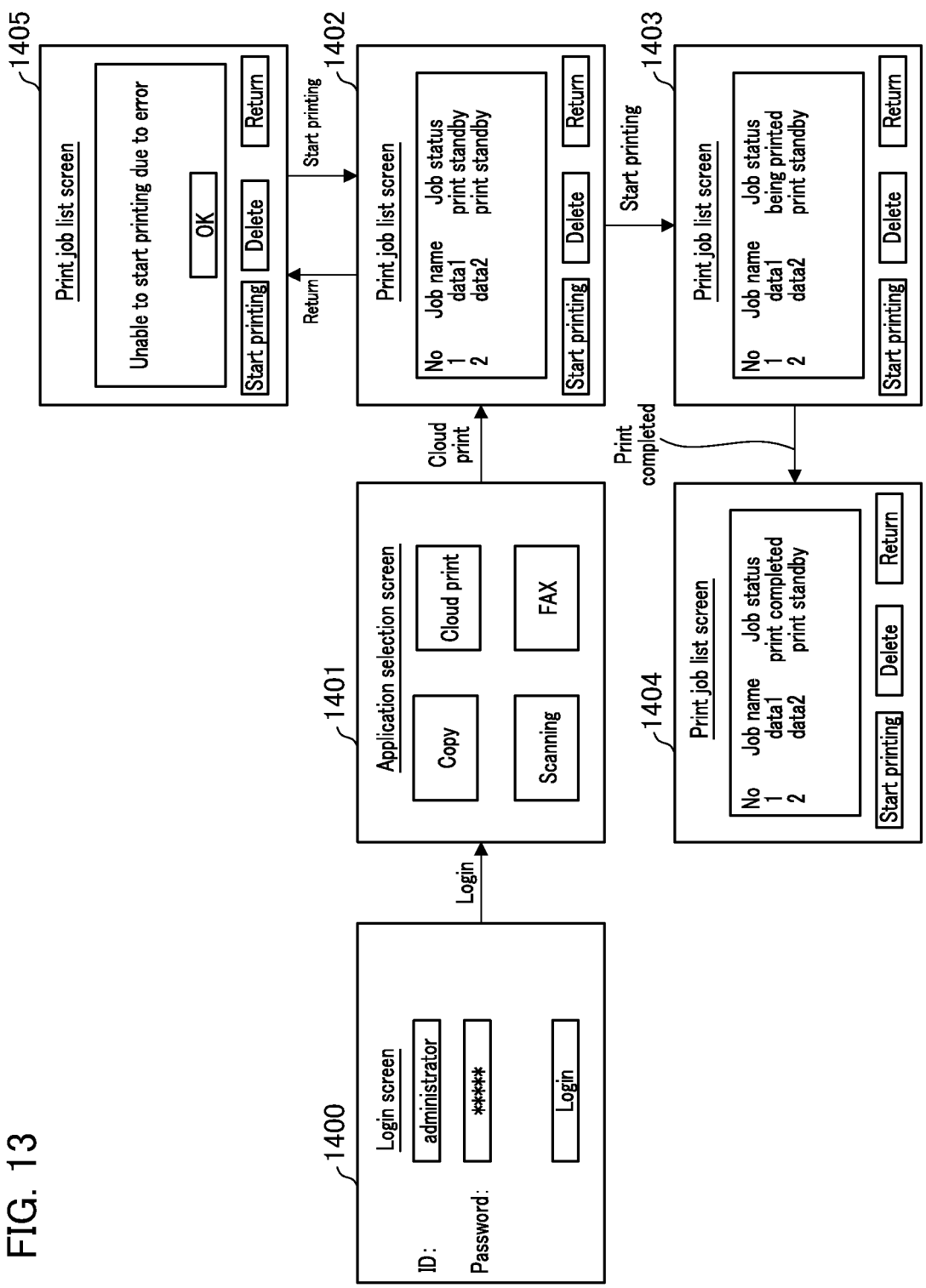
FIG. 13 is a conceptual diagram illustrating the transition of an operation screen in the image forming apparatus according to the fifth embodiment.

FIG. 12 illustrates a printing procedure in a normal condition in the system according to the present embodiment. FIG. 13 is a conceptual diagram illustrating the transition of a screen displayed by the operation unit 205 of the image forming apparatus 101.

As in the third embodiment, first, the print job data is transmitted from the client terminal 103 to the cloud print server 102 (S1301) and is stored in the cloud print server 102 (S1302). Then, the cloud print server 102 updates the job status (S1303).

Subsequently, the user operates the login screen 1400 (refer to FIG. 13) of the image forming apparatus 101 to log in to the image forming apparatus 101 (S1304). After the login operation, the image forming apparatus 101 switches the screen to an application selection screen 1401, and then requests the cloud print server 102 to provide the job information corresponding to the user (S1305).

In response to the job information request, the cloud print server 102 transmits the job information to the image forming apparatus 101 (S1306).

The image forming apparatus 101 creates a print job list corresponding to the user based on the received job information. When the user selects "CLOUD PRINT" on the application selection screen 1401, the image forming apparatus 101 switches the screen to a print job list screen 1402 and displays the created print job list (S1307). Although in the present embodiment, the image forming apparatus 101 transmits the job list acquisition request immediately after the user logs in, it may transmit the job list acquisition request after the user selects the "CLOUD PRINT" on the application selection screen 1401.

The user operates the print job list screen 1402 to selects a job to be printed from the job list (S1308). Thereby, the image forming apparatus 101 requests the cloud print server 102 to provide the job data of the selected print job (S1309).

Upon receiving this job information acquisition request, the cloud print server 102 updates the job status to "Being Printed" (S1310), and then transmits the print job data related to the user to the image forming apparatus 101 (S1311). When the transmission of the print job data has completed, the cloud print server 102 deletes the transmitted print job data from its own storage (S1312).

Upon receiving the print job data, the image forming apparatus 101 starts the print processing (S1313). At the same time, the image forming apparatus 101 switches the "JOB STATUS" of the corresponding print job to "BEING PRINTED", as shown on a screen 1403.

Subsequently, when the printing has completed, the image forming apparatus 101 switches the "JOB STATUS" of the corresponding print job to "PRINT COMPLETED" as shown on a screen 1404. And then, the image forming apparatus 101 transmits job status update information that provides a notification about the completion of the print job to the cloud print server 102 (S1314).

Upon receiving the notification about the completion of the print job, the cloud print server 102 updates the job status to "Completed" (S1315).

Subsequently, the user logs out and the print processing ends (S1113).

Next, a case in which an error occurs in the image forming apparatus 101 in the present embodiment will be described.

According to the present embodiment, an operation for causing the image forming apparatus 101 to acquire a print job cannot be performed by the user when an error occurs.

Hence, according to the present embodiment, when the user selects "Start Printing" after selecting any job on the print job list screen 1402, a screen 1405 showing that printing is impossible is displayed.

Figure 14A:
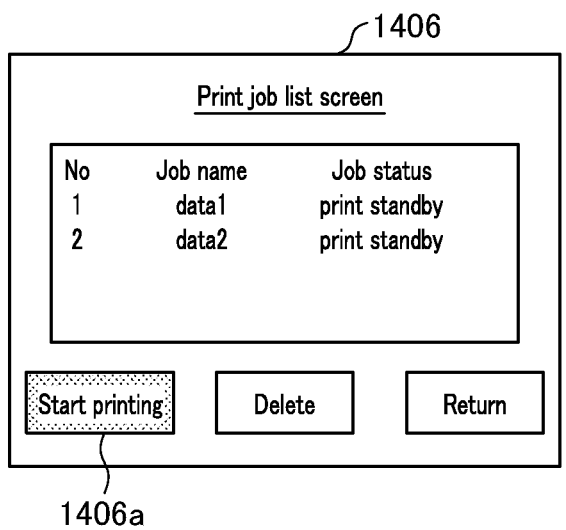
FIG. 14A and FIG. 14B are conceptual diagrams illustrating an operation screen when a printing error occurs in the image forming apparatus according to the fifth embodiment.

Another example may be used in which the user is not allowed to select a "Start Printing" button 1406a when the user selects "Cloud Print" on the application selection screen 1401, and the print job list screen 1406 is displayed (refer to FIG. 14A). At this time, it is possible to make the user recognize that selecting "Start Printing" is not allowed, for example, by making the display color of the "START PRINTING" button gray.

Figure 14B:
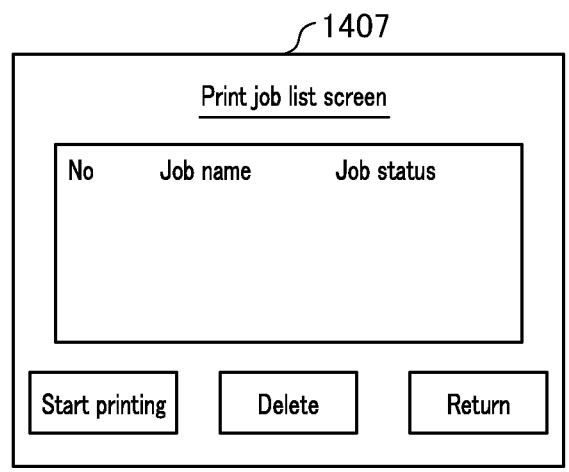

Furthermore, another example may be used in which the print job is not displayed when the user selects "Cloud Print" on the application selection screen 1401, as in a print job list screen 1407 (refer to FIG. 14B).

In the present embodiment, when a predetermined error occurs in the image forming apparatus 101, the user cannot perform an operation for selecting a print job and starting printing. In the present embodiment, when the predetermined error occurs, the job acquisition request processing stops, and thereby, the acquisition of the print job data by the image forming apparatus 101 stops. As a result, according to the present embodiment, the cloud print server 102 does not delete the print job data of the logged-in user, and the logged-in user does not have to input the same print job to the cloud print server 102 again after the error is resolved.

Additionally, as in the above embodiments, because the cloud print server 102 does not transmit the print job data to the Internet 104 after the error occurs, the communication band is not used wastefully.

Note that the feature in which errors occurring in the image forming apparatus 101 are classified into a plurality of types of errors and the acquisition and execution of the print job can be set to stop only when a predetermined error occurs (refer to FIG. 7 and FIG. 8) is similar to that in above the embodiments.

Fifth Embodiment

Hereinafter, as the fifth embodiment, an operation of the system of the present invention not concerning the print processing will be described.

The image forming apparatus 101 and the cloud print server 102 not only transmit and receive signals related to print jobs, but also transmit and receive signals necessary for, for example, communication management. For example, the image forming apparatus 101 is registered in the cloud print server 102, and then acquires an access token from the cloud print server 102.

It is well known that the access token has a time limit. Hence, the image forming apparatus 101 needs to periodically communicate with the cloud print server 102 to update the access token.

FIG. 15 is a sequence diagram illustrating a process for updating the access token.

For registering the image forming apparatus 101, first, the image forming apparatus 101 transmits a registration request to the cloud print server 102 (S1501). Then, in response to the registration request, an access token is transmitted from the cloud print server 102 (S1502). Thus, the image forming apparatus 101 acquires the access token.

As described above, the access token has a time limit and so needs to be updated periodically. Accordingly, the image forming apparatus 101 periodically requests the cloud print server 102 to update the token (S1503, S1504).

Even if a printing error occurs here, the access token can be continuously updated. Accordingly, the image forming apparatus 101 periodically requests the cloud print server 102 to update the token also during the period of time from the occurrence of the printing error (S1505) to the resolution of the printing error (S1508).

After the printing error is resolved, the image forming apparatus 101 continues to periodically request the cloud print server 102 to update the token (S1509, S1510).

As described above, according to the present invention, when a printing error occurs in the image forming apparatus 101, the continuation of processes for operations not related to the print processing is not obstructed.

Other Embodiments

The present invention can also be achieved by a process in which software that achieves the functions of the above embodiments is supplied to a system or an apparatus via a network or various storage media, and a computer of the system or apparatus reads out and executes a program.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-099474, filed May 28, 2019, which is hereby incorporated by reference wherein in its entirety.

What is claimed is:

1. An image forming apparatus executing print processing based on a print job obtained from a server via a network, comprising:
   a printing section; and
   a controller that includes at least one storage that is capable to store obtained print job data at least temporarily and at least one processor that executes a set of instructions to cause the image forming apparatus to perform operations comprising:
   transmitting an event confirmation request to the server;
   confirming whether or not a job fetch event has occurred by receiving a response to the event confirmation request;
   transmitting a job acquisition request to the server if the job fetch event has occurred, and obtaining print job data for executing the print job from the server;
   controlling the printing section to perform the print processing based on the obtained print job data;
   detecting a first error state in which the print processing cannot be performed and which is an error state in the image forming apparatus caused by at least one of hardware parts comprising the printing section; and
   controlling at least the job acquisition request not to be transmitted to the server while the first error state continues, even if the image forming apparatus is able to receive the print job and store the obtained print job data in the at least one storage,
   wherein a transmission of the job acquisition request is performed if the first error state has not occurred and a second error state continues, the second error state being caused by hardware parts comprising a particular section that does not affect the performing of the printing processing and performing of storing processing for storing the obtained print job data in the at least one storage.

2. The image forming apparatus according to claim 1, wherein the event confirmation request are repeatedly transmitted at a predetermined cycle.

3. The image forming apparatus according to claim 2, wherein the transmission of the event confirmation request is controlled to be stopped while a detected error state continues, and the transmission of the event confirmation request is resumed when the detected error state is resolved.

4. The image forming apparatus according to claim 2, wherein if the first error state continues, controlling the job acquisition request not to be transmitted and controlling the event confirmation request to be transmitted periodically at a predetermined cycle are performed.

5. The image forming apparatus according to claim 1, wherein the operations further comprise:
   authenticating an operator's login; and
   transmitting a job information request to the server, and thereby acquiring information about the print job corresponding to the logged-in operator from the server when the job fetch event has occurred, and wherein, when acquiring the information, only the print job data corresponding to the logged-in operator is acquired using the acquired information.

6. The image forming apparatus according to claim 5, wherein the operations further comprise:

displaying the acquired information about the print job, and then making the operator select the print job to be executed.

7. The image forming apparatus according to claim 6, wherein, after the print job to be executed is selected, the job acquisition request for obtaining the print job data corresponding to the selected print job from the server is transmitted, and wherein, while the error state continues, the job acquisition request is made not to be performed by not accepting an operation to select the print job.

8. The image forming apparatus according to claim 1, wherein the operations further comprise;

transmitting a job information request to the server, and thereby acquiring information about the print job;

displaying a job selection screen including a print job list based on the acquired information; and controlling the printing of the print job selected via the job selection screen is not performed while the error state continues, wherein the acquiring of the information and the displaying of the print job list are performed even if the error state continues.

9. The image forming apparatus according to claim 1, wherein the first error state is the error state caused by developing parts or drum parts, and the second error state is the error state caused by the hardware parts that comprise a scanner section.

10. The image forming apparatus according to claim 1, wherein the operations further comprise requesting an external device to update an access token to access the server, and wherein requesting the external device is performed even if the error state continues.

11. A control method for an image forming apparatus having a printing section and at least one controller that includes at least one storage that is capable to store an obtained print job, the method comprising:

transmitting an event confirmation request to a server;

confirming whether or not a job fetch event has occurred by receiving a response to the event confirmation request;

transmitting a job acquisition request to the server if the job fetch event has occurred, and obtaining print job data for executing a print job from the server;

controlling the printing section to perform print processing based on the obtained print job data;

detecting a first error state in which the print processing cannot be performed and which is an error state in the image forming apparatus caused by at least one of hardware parts comprising the printing section; and controlling at least the job acquisition request not to be transmitted to the server while the first error state continues, even if the image forming apparatus is able to receive the print job and store the obtained print job data in the at least one storage, wherein a transmission of the job acquisition request is performed if the first error state has not occurred and a second error state continues, the second error state being caused by hardware parts comprising a particular section that does not affect the performing of the printing processing and performing of storing processing for storing an obtaining print job data in the at least one storage.

12. The control method according to claim 11, wherein the event confirmation request are repeatedly transmitted at a predetermined cycle.

13. The control method according to claim 12, wherein the transmission of the event confirmation request is controlled to be stopped while a detected error state continues, the transmission of the event confirmation request is resumed when the detected error state is resolved.

14. The control method according to claim 11, further comprising:

performing a process of authenticating an operator's login; and transmitting a job information request to the server, and thereby acquiring information about the print job corresponding to a logged-in operator from the server when the job fetch event has occurred, wherein, when acquiring the information, only the print job data corresponding to the logged-in operator is acquired using the acquired information.

15. The control method according to claim 14, further comprising:

displaying the acquired information about the print job, and then making the operator select the print job to be executed.

16. The control method according to claim 15, wherein, after the print job to be executed is selected, the job acquisition request for obtaining the print job data corresponding to the selected print job from the server is transmitted, and wherein, while the error state continues, the job acquisition request is made not to be performed by not receiving an operation that selects the print job.

17. A non-transitory storage medium on which a computer program is stored for making a computer execute a method for controlling an image forming apparatus having a printing section, the method comprising:

transmitting an event confirmation request to a server;

confirming whether or not a job fetch event has occurred by receiving a response to the event confirmation request;

transmitting a job acquisition request to the server if the job fetch event has occurred, and obtaining print job data for executing a print job from the server;

controlling the printing section to perform print processing based on the obtained print job data;

detecting a first error state in which the print processing cannot be performed and which is an error state in the image forming apparatus caused by at least one of hardware parts comprising the printing section; and controlling at least the job acquisition request not to be transmitted to the server while the first error state continues, even if the image forming apparatus is able to receive the print job and store the obtained print job data in at least one storage, wherein a transmission of the job acquisition request is performed if the first error state has not occurred and a second error state continues, the second error state being caused by hardware parts comprising a particular section that does not affect the performing of the printing processing and performing of storing processing for storing an obtaining print job data in the at least one storage.

* * * * *